United States Patent [19]

Kondo et al.

[11] Patent Number: 5,174,815
[45] Date of Patent: Dec. 29, 1992

[54] LITHOGRAPHIC PRINTING INK ADDITIVE

[75] Inventors: Toshiro Kondo; Yasuo Tsubai, both of Nagaokakyo, Japan

[73] Assignee: Mitsubishi Paper Mills Limited, Tokyo, Japan

[21] Appl. No.: 228,001

[22] Filed: Aug. 3, 1988

[30] Foreign Application Priority Data

| Aug. 3, 1987 | [JP] | Japan | 62-194933 |
| Aug. 3, 1987 | [JP] | Japan | 62-194935 |
| Oct. 6, 1987 | [JP] | Japan | 62-252734 |

[51] Int. Cl.$^5$ ............................................. C09D 11/00
[52] U.S. Cl. ................................. 106/20 R; 106/30 R
[58] Field of Search ....................... 106/20, 23, 32, 30

[56] References Cited

U.S. PATENT DOCUMENTS

| 4,508,570 | 4/1985 | Fujii et al. | 106/22 |
| 4,589,920 | 5/1986 | Kanada et al. | 106/20 |
| 4,732,616 | 3/1988 | Kondo et al. | 106/30 |
| 4,908,063 | 3/1990 | Baker et al. | 106/22 |
| 4,923,515 | 5/1990 | Koike et al. | 106/20 |
| 4,985,077 | 1/1991 | Ise et al. | 106/22 |
| 5,049,188 | 9/1991 | Takimoto et al. | 106/20 |

FOREIGN PATENT DOCUMENTS

| 1471723 | 5/1969 | Fed. Rep. of Germany . |
| 138677 | 6/1986 | Japan . |

*Primary Examiner*—Mark L. Bell
*Assistant Examiner*—Helene Klemanski
*Attorney, Agent, or Firm*—Cushman, Darby & Cushman

[57] ABSTRACT

This invention provides an ink additive comprising at least one compound selected from a polymer represented by the following formula (I) and a polymer which contains unsubstituted or substituted alkylene oxide unit having a total carbon number of 4 of more and has an average molecular weight of 400 or more.

$$HO-Z-R \qquad (I)$$

(wherein Z comprises 4 mols or more of $$-\underset{\underset{CH_3}{|}}{CHCH_2O}-$$

unit and $-CH_2CH_2O-$ and/or $$-\underset{\underset{OH}{|}}{CH_2CHCH_2O}-$$

or 10 mols or more of only $$-\underset{\underset{CH_3}{|}}{CHCH_2O}-.$$

R represents a hydrogen atom or an organic group and average molecular weight of the polymer is 400 or more.)

6 Claims, No Drawings

LITHOGRAPHIC PRINTING INK ADDITIVE

BACKGROUND OF THE INVENTION

This invention relates to an ink additive for lithographic printing.

Lithographic printing plates consist of greasy ink receptive oleophilic image portions and ink repellent oleophobic non-image portions, the latter being generally water receptive hydrophilic areas. Therefore, the customary lithographic printing is carried out by feeding water and colored ink to the printing plate surface to allow the image portions to receive preferentially the colored ink and the non-image portions preferentially water and then transferring the ink deposited on image portions onto a substrate such as paper. As lithographic printing plates which use a damping solution, there have been known presensitized plates (so-called PS plate) which use diazonium compounds, lithographic printing plates made electrophotographically using zinc oxide or organic photoconductors and lithographic printing plates made by silver salt photography which uses a silver halide emulsion as a light sensitive component. There are a wide variety of inks used for these lithographic printing plates. However, conventional printing inks can provide good prints in case of using some specific printing plates or damping solutions, but they sometimes cause various defects on change of kinds of the printing plates or printing conditions and often cannot be used at all. As properties required for such printing ink, not only deposition of sufficient ink on image portions and deposition of no ink on non-image portions are important, but also flowability, interfacial property and drying characteristics must also be considered. Especially, in the lithographic printing, oily ink and water are repeatedly fed for every print during printing of thousands to tens of thousands of copies and hence image portions are caused to expand or to disappear, emulsification of ink occurs or scumming occurs unless interfacial tension or surface tension between oily ink and water is properly balanced. Therefore, oily inks of excellent interfacial properties are required.

U.S. Pat. No. 4,589,920 discloses an ink additive for lithographic printing which comprises organopolysiloxane having hydrophilic group and Japanese Patent Kokai No. 61-138677 describes an additive for lithographic printing ink which comprises a compound having alkylene oxide unit and having an HLB of 3-13. This compound can give good interfacial properties to ink and prevent scumming, but they are not sufficient for some lithographic printing materials, inks, damping solution and printing machines. For example, when a printing plate made by silver salt photography which is poor in water retention is used for high speed offset rotary printing, scumming occurs much and when the compound described in the above Japanese patent publication is added to ink, the scumming can be reduced, but this is not sufficient. Further, it is well known to use fine particles of 0.1μ or less such as colloidal silica in solutions for treatment of plate surface subsequent to development treatment in making of the lithographic printing plate by silver salt photography, for example, damping solution disclosed in Japanese Patent Kokai No. 48-45305, neutralizing solution in Japanese Patent Kokai No. 54-83502, neutralizing solution, ethch solution and damping solution in Japanese Patent Application No. 55-104176 and fixing agent (fixing solution) and damping solution in Japanese Kokoku No. 45-29001. It is considered that inorganic fine particles such as colloidal silica and colloidal alumina are adsorbed onto the surface of lithographic printing plate to form a hydrophilic layer on the surface, but the object of prevention of stain by printing ink which is most desired cannot be sufficiently accomplished and besides these particles damage the ink receptivity of image portions.

Thus, development of techniques according to which staining can be prevented without using such inorganic fine particles has been much demanded.

SUMMARY OF THE INVENTION

An object of this invention is to provide an ink additive for obtaining lithographic printing ink which can sharply improve interfacial characteristics and can prevent staining of non-image portions without damaging the ink receptivity of image portions.

Another object of this invention is to provide an ink additive which can very efficiently prevent stains in non-image portions in high speed offset rotary printing which often causes staining.

Still further object of this invention is to provide an ink additive which can prevent staining with using plate surface treating solutions containing no inorganic fine particles.

DESCRIPTION OF THE INVENTION

The above objects of this invention have been attained by adding to a printing ink at least one compound selected from a polymer represented by the following formula (I) and a compound which contains unsubstituted or substituted alkylene oxide unit having a total carbon number of 4 or more and has an average molecular weight of 400 or more.

HO—Z—R  (I)

(wherein Z comprises 4 mols or more of

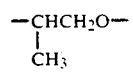

—CHCH$_2$O—
 |
 CH$_3$ unit and —CH$_2$CH$_2$O— and/or

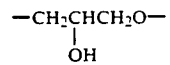

—CH$_2$CHCH$_2$O—
   |
   OH or 10 mols or more of only

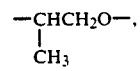

—CHCH$_2$O—,
 |
 CH$_3$

R represents a hydrogen atom or an organic group and average molecular weight of the polymer is 400 or more.)

The polymer represented by the above formula has a

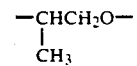

—CHCH$_2$O—
 |
 CH$_3$ (abbreviated to "PO" hereinafter) unit, a CH$_2$CH$_2$O— (abbreviated to "EO" hereinafter) unit and/or a

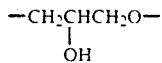

(abbreviated to "GO" hereinafter) unit and has an average molecular weight of 400 or more, preferably 700 or more, especially preferably 1,000 or more. Upper limit of the molecular weight is generally about 8,000, but it may exceed the upper limit.

The PO unit is present in an amount of 4 mols or more, preferably 6-60 mols, but may be present in more than 60 mols. The polymer may comprise only PO unit in an amount of 10 mols or more. The PO unit is preferably in an amount of about 5-about 99% by weight, more preferably about 20-about 95% by weight of the polymer.

The R in the above formula (I) represents a hydrogen atom or an organic group such as alkyl group of 1-20 carbon atoms (e.g., methyl, ethyl, propyl, octyl, decyl, dodecyl and octadecyl), an aryl group (e.g., nonylphenyl), an alkylcarbonyl group or arylcarbonyl group (e.g., benzoyl and p-methylbenzoyl).

Among the polymers of the formula (I), especially preferred are block polymers represented by the following formula (Ia):

HO—EO )$_b$( PO )$_a$( EO )$_c$ R  (Ia)

In the above formula, a represents an integer of 4-60, b and c each represents an integer of more than 1 and b+c is preferably such that the EO unit constitutes about 5-about 95% by weight of the polymer and R is as defined above.

The above formula (I) further includes the polymers represented by the following formulas (Ib) and (Ic) as preferable polymers.

HO—PO )$_b$( GO )$_a$( PO )$_c$ R  (Ib)

HO—EO )$_d$( PO )$_b$( GO )$_a$( PO )$_c$( EO )$_e$ R  (Ic)

In the above formulas, a represents an integer of 1 or 2 or more, b, c, d and e each represents an integer of more than 1 and b+c is preferably such that the PO unit constitutes about 5-about 99% by weight of the polymer and R is as defined above.

As the compounds containing unsubstituted or substituted alkylene oxide unit having a total carbon number of 4 or more and having an average molecular weight of 400 or more, mention may be made of, for example, unsubstituted alkylene oxides of 4-12 carbon atoms or alkylene oxides of 2-12 carbon atoms substituted with a lower alkyl group ( for example, methyl, ethyl, propyl or butyl), a substituted alkyl group (for example, alkyl group substituted with an alkoxy group such as methoxy, ethoxy or butoxy, an alkylthio such as methylthio, ethylthio or butylthio, an aryloxy such as phenoxy or an arylthio such as phenylthio) or an aryl group (for example, phenyl, 4-bromophenyl, 4-cyanophenyl or 4-methoxyphenyl).

These compounds are preferably copolymers prepared by block or random copolymerization of a hydrophilic polyethylene oxide unit on said alkylene oxide unit having 4 or more carbon atoms and furthermore may contain a polypropylene oxide unit.

Specific examples of the compounds of this invention are shown below.

Compound (1)

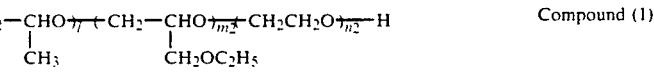

Compound 2

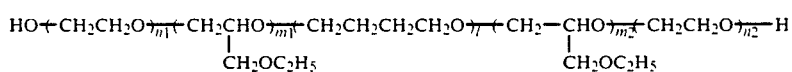

Compound (3)

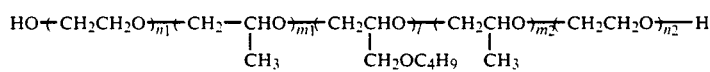

Compound (4)

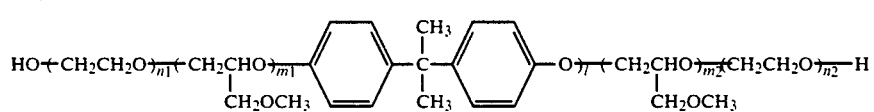

Compound (5)

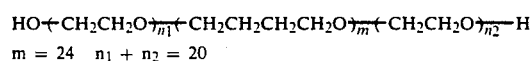

Compound (6)

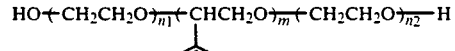

Compound (7)

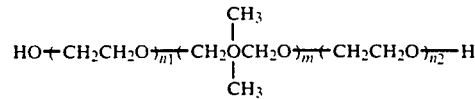

-continued

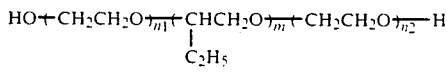

Compound (8)

$m = 15 \quad n_1 + n_2 = 15$

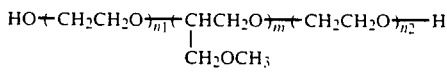

Compound (9)

$m = 15 \quad n_1 + n_2 = 15$

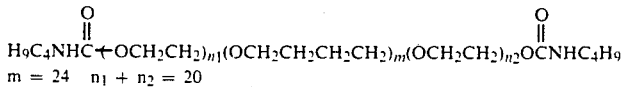

Compound (10)

$m = 24 \quad n_1 + n_2 = 20$ $H + OCH_2CH_2CH_2CH_2 \rightarrow_l OH$

Compound (11)

$l = 16$

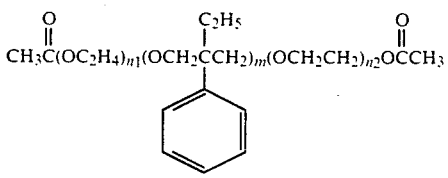

Compound (12)

$m = 20 \quad n_1 + n_2 = 100$

The compounds of the above two groups, namely, ink additives are known and are easily available from surfactant manufacturers and can be synthesized by known methods.

The ink additives of the present invention can be added to commercially available inks for lithographic printing and can also be added to vehicles of ink during preparation of inks.

According to one preferred embodiment of the ink additives of this invention, in the case of adding the additives to inks for lithographic printing which contain at least the main ink ingredients of a pigment and a vehicle (normally those commercially available), the additives are added as a composition of a resin (vehicle) miscible with the vehicle of ink and at least one of the compounds of two groups.

As vehicles, there may be used preferably the ordinary vehicles for lithographic printing ink, for example, natural and processed resins such as drying oil, synthetic drying oil, rosin, copal, dammer, shellac, hardened rosin and rosin esters, phenolic resin, rosin modified phenolic resin, 100% phenolic resin, maleic acid resin, alkyd resin, petroleum resin, vinyl resin, acrylic resin, polyamide resin, epoxy resin, aminoalkyd resin, polyurethane resin and aminoplast resin.

The ratio of the compound according to this invention and the vehicle may be in any range, but is preferably 1:0.5-1:5 (weight ratio).

Amount of the compound added to lithographic printing ink may vary depending on the kinds of ink and printing palte and can be added in an amount of about 1-about 10% by weight as standard.

The ink additives of this invention may further contain various additives used in lithographic printing inks such as plastisizers, stabilizers, drying agents, thickening agents, dispersants and fillers.

The ink additives of this invention can be applied for lithographic printing plates and printing inks used for offset printing using a damping solution regardless of their kinds. Further, a wide variety of damping solutions can be used. Not only normal water, but also water containing customary substances such as accelerators for rendering oil-insensitive, buffers, preservatives and wetting agents may be used to improve treatment activity. For example, one or more of the following substances can be added: gum arabic, carboxymethylcellulose, sodium alginate, polyvinylpyrrolidone, polyvinylimidazole, polyvinylmethyl ether-maleic anhydride copolymer, carboxymethyl starch, ammonium alginate, alginic acid oxidized cellulose, methylcellulose, sulfates (sodium sulfate and ammonium sulfate), phosphoric acid, nitric acid, nitrous acid, tannic acid and salts thereof, polyol compounds having 2 or more hydroxyl groups (e.g., polyethylene glycol, ethylene glycol, propylene glycol, glycerol, diethylene glycol and hexylene glycol), organic weak acids (e.g., citric acid, succinic acid, tartaric acid, adipic acid, ascorbic acid and propionic acid), polyacrylic acid, ammonium bichromate, chrome alum, propylene glycol alginate, aminopolycarboxylates (e.g., sodium ethylenediaminetetraacetate), inorganic colloids (e.g., colloidal silica) and surface active agents.

It is also possible to add water-miscible organic solvents such as methanol, dimethylformamide and dioxane and colorants such as phthalocyanine dyes, Malachite Green and ultramarine, considering especially identification and appearance of the solution.

The following nonlimiting examples further explain the invention.

EXAMPLE 1

A lithographic printing plate material (SILVER MASTER manufactured by Mitsubishi Paper Mills Ltd.) which utilizes silver complex diffusion transfer process to make printing plate was imagewise exposed by a process camera and developed with the following silver complex diffusion transfer developer at 30° C. for 1 minute.

| Transfer developer | |
| --- | --- |
| Water | 750 ml |
| Potassium hydroxide | 20 g |

| Transfer developer | |
|---|---|
| Anhydrous sodium sulfite | 60 g |
| Potassium bromide | 0.5 g |
| 2-Mercaptobenzoic acid | 1 g |
| 3-Mercapto-4-acetamido-5-n-heptyl-1,2,4-triazole | 0.15 g |
| 2-Methyl-2-amino-1-propanol | 10 g |
| Made up with water to 1 liter. | |

After the development, the material was passed through two squeeze rollers to remove the excess developer, immediately thereafter treated with a neutralizing solution having the following composition at 25° C. for 20 seconds, then again passed through the squeeze rollers to remove the excess solution and dried at room temperature.

| Neutralizing solution | |
|---|---|
| Water | 600 ml |
| Ethylene glycol | 5 ml |
| Citric acid | 10 g |
| Sodium citrate | 35 g |
| Made up with water to 1 liter. | |

Thus made lithographic printing plate was mounted on an offset rotary printing machine and applied over the whole surface with the following etch solution and printing was carried out using the following damping solution.

| Etch solution | |
|---|---|
| Water | 600 ml |
| Isopropyl alcohol | 400 ml |
| Ethylene glycol | 50 ml |
| 3-Mercapto-4-acetamide-5-n-heptyl-1,2,4-triazole | 1 g |
| Damping solution (used) | |
| Orthophosphoric acid | 10 g |
| Nickel nitrate | 5 g |
| Sodium nitrite | 5 g |
| Ethylene glycol | 100. ml |
| Made up with water to 20 liters. | |

The printing was carried out by a high speed offset rotary printing machine provided with a device for continuous feeding of damping solution and offset rotary printing ink (WEBLEX HIGHMARK SS manufactured by Dainichi Kasei Kogyo Co.). This was a blank ink. On the other hand, printing was similarly carried out using the above WEBLEX HIGHMARK SS ink in which was incorporated about 3% by weight of the compound of the formula (Ia) wherein R was hydrogen and b+c/a (weight ratio) was as shown in Table 1.

TABLE 1

| Compound | (b + c/a) | Mean molecular weight |
|---|---|---|
| (1) | 20/80 | 1280 |
| (2) | 40/60 | 1670 |
| (3) | 10/90 | 2220 |
| (4) | 40/60 | 3330 |

Similarly, the following compounds were also tested as comparative compounds.

| Comparative compound-1: | Ethylene glycol butyl ether |
|---|---|
| Comparative compound-2: | Heptaethylene glycol mono-p-nonylphenyl ether |
| Comparative compound-3: | Propylene glycol butyl ether |
| Comparative compound-4: | Polypropylene glycol (mean molecular weight 600) |

Printing with the blank ink resulted in dense stains on the whole surface. The printing ink containing the compounds (1)–(4) which were the ink additives of this invention caused no stains and provided good prints of high ink density and the effect was remarkable. The four comparative compounds showed some effect of stain prevention as compared with the blank ink, but the effect was utterly unsatisfactory as compared with the ink additives of this invention.

EXAMPLE 2

Example 1 was repeated using the compounds of the formulas (Ib) and (Ic) shown in Table 2. The results were similar to those of Example 1.

TABLE 2

| Compound | Formula | a | b + c | d + e | R |
|---|---|---|---|---|---|
| (5) | Ib | 1 | 20 | — | H |
| (6) | Ib | 1 | 40 | — | H |
| (7) | Ib | 1 | 60 | — | H |
| (8) | Ic | 1 | 30 | 30 | H |

EXAMPLE 3

Example 1 was repeated using NEWS Z (Dainippon Ink & Chemical Co.) as the offset rotary printing ink and the compounds of the formula (Ia) (R=H) shown in Table 3 as the ink additives. The results were similar to those of Example 1.

TABLE 3

| Compound | a | b + c |
|---|---|---|
| (9) | 6 | 8 |
| (10) | 20 | 20 |
| (11) | 40 | 20 |
| (12) | 60 | 20 |
| (13) | 20 | 40 |

(In the above tables, numerical value is mol number.)

EXAMPLE 4

Example 1 was repeated except that the compound of this invention and the comparative compound were respectively kneaded with an equal amount of a rosin modified alkylphenol resin and these were used as ink additives. The results were similar to those of Example 1.

EXAMPLE 5

Example 1 was repeated except that commercially available PS plate was used as printing plate. Light stain occurred in the prints when the blank ink and inks containing the comparative compound were used while no stain occurred when inks containing the ink additives of this invention were used and besides there were obtained good prints of high ink density.

EXAMPLE 6

Example 1 was repeated except that the compounds shown in Table 4 which were represented by the following formula (Id) were used in an amount of about 3% by weight were used as ink additives.

$$HO\text{---}(PO)_l\text{---}(EO)_m\text{---}R \qquad (Id)$$

TABLE 4

| Compound | l | m | R |
|---|---|---|---|
| Comparative compound-1 | 0 | 1 | —C$_4$H$_9$ |
| Comparative compound-2 | 0 | 6 | 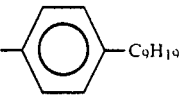 |
| Comparative compound-3 | 0 | 90 | H |
| Comparative compound-4 | 1 | 0 | —C$_4$H$_9$ |
| (1) | 40 | 5 | H |
| (2) | 20 | 10 | H |
| (3) | 15 | 0 | H |
| (4) | 6 | 6 | —C$_{12}$H$_{25}$ |
| (5) | 15 | 15 | —C$_{18}$H$_{37}$ |
| (6) | 6 | 33 | —C$_{18}$H$_{37}$ |
| (7) | 11 | 14 | —C$_8$H$_{17}$ |
| (8) | 11 | 0 | —C$_4$H$_9$ |
| (9) | 40 | 40 | —C$_4$H$_9$ |

Dense stains occurred on the whole surface when the blank ink was used. The inks containing the ink additives (1)–(9) caused no stains and produced good prints of high ink density. Thus, the effect was remarkable. Some effect of stain prevention was exhibited with the four comparative compounds as compared with the blank ink, but this effect was utterly unsatisfactory as compared with the ink additives of this invention.

EXAMPLE 7

Example 6 was repeated using NEWS Z (Dainippon Ink & Chemical Co.) as the offset rotary printing ink. The results were similar to those of Example 6.

EXAMPLE 8

Example 6 was repeated except that the compound of this invention and the comparative compound were respectively kneaded with an equal amount of a rosin modified alkylphenol resins and these were used as ink additives. The results were similar to those of Example 6.

EXAMPLE 9

Example 6 was repeated except that commercially available PS plate was used as printing plate. Light stain occurred in the prints when the blank ink and inks containing the comparative compound were used while no stain occurred when inks containing the ink additives of this invention were used and besides there were obtained good prints of high ink density.

EXAMPLE 10

Example 1 was repeated using the exemplified compounds (1), (5), (8) and (10) and the following comparative compounds (a), (b), (c) and (d) in an amount of about 3% by weight.

Comparative compound (a):
HO—CH$_2$CH$_2$O—C$_4$H$_9$

Comparative compound (b):

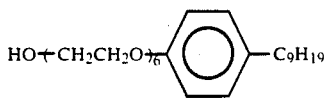

Comparative compound (c):

HO$\leftarrow$CH$_2$CH$_2\rightarrow_{90}$H

Comparative compound (d):

HO—CHCH$_2$O—C$_4$H$_9$
         |
        CH$_3$

Dense stains occurred on the whole surface when the blank ink was used. The inks containing the ink additives of this invention caused no stains and produced good prints of high ink density. Thus, the effect was remarkable. Some effect of stain prevention was exhibited with the four comparative compounds as compared with the blank ink, but this effect was utterly unsatisfactory as compared with the ink additives of this invention.

EXAMPLE 11

Example 10 was repeated using NEWS Z (Dainippon Ink & Chemical Co.) as the offset rotary printing ink. The results were similar to those of example 10.

EXAMPLE 12

Example 10 was repeated except that the compound of this invention and the comparative compound were respectively kneaded with an equal amount of a rosin modified alkylphenol and these were used as ink additives. The results were similar to those of Example 10.

EXAMPLE 13

Example 10 was repeated except that commerically available PS plate was used as printing plate. Light stain occurred in the prints when the blank ink and inks containing the comparative compound were used while no stain occurred when inks containing the ink additives of this invention were used and besides there were obtained good prints of high ink density.

The ink additives of this invention can very effectively prevent staining even when offset rotary printing ink and printing plates which often cause stain are used and besides can provide good prints of high ink density. Further, inorganic fine particles such as colloidal silica are not necessarily required in surface processing solution and hence prints of higher ink density can be obtained.

What is claimed is:

1. A lithographic printing ink which comprises a pigment, a vehicle and an ink additive which comprises at least one polymer having a mean molecular weight of about 400 to about 8,000 and wherein said at least one polymer is selected from the group consisting of the following polymers (a) and (b):

(a) a block polymer represented by the following formula (Ia):

$$HO\text{---}(\text{---EO---})_b\text{---}(PO)_a\text{---}(EO)_c\text{---}R \qquad (Ia)$$

wherein a represents an integer of 4–60, b and c each represents an integer of more than 1 and EO denotes —CH$_2$CH$_2$O— and PO denotes

—CHCH$_2$O—
        |
       CH$_3$ and R is selected from the group consisting of a hydrogen atom, an alkyl group, an aryl group, an alkylcarbonyl group or an arylcarbonyl group; and (b) a polymer having unsubstituted or substituted alkylene oxide units having at least 4 carbon atoms;

wherein said printing ink additive is present in an amount from 1 to 10% by weight.

2. A lithographic printing ink as claimed in claim 1 wherein the weight ratio of said printing additive to said vehicle component is in the range 1:0.5 to 1:5.

3. A lithographic printing ink which comprises a pigment, a vehicle and an ink additive which comprises at least one polymer having a mean molecular weight of about 400 to about 8,000 and wherein said at least one polymer is selected from the group consisting of the following polymers (a) and (b):

(a) a polymer selected from polymers of the formula (Ib) or (Ic):

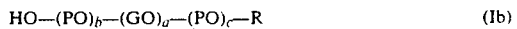  (Ib)

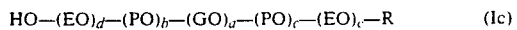  (Ic)

wherein a represents an integer of 1 or more and b, c, d and e each represents an integer of more than 1 and PO denotes

and EO denotes —CH$_2$CH$_2$O— and GO denotes

and R is selected from a hydrogen atom, an alkyl group, an aryl group, an alkylcarbonyl group or an arylcarbonyl group; and (b) a polymer having unsubstituted or substituted alkylene oxide units having at least four carbon atoms;

wherein said printing ink additive is present in an amount from 1 to 10% by weight.

4. A lithographic printing ink as claimed in claim 3 wherein the weight ratio of said printing additive to said vehicle component is in the range 1:0.5 to 1:5.

5. A lithographic printing ink which comprises a pigment, a vehicle and an ink additive which comprises at least one polymer having a mean molecular weight of about 400 to about 8,000 and wherein said at least one polymer is selected from the group consisting of the following polymers (a) and (b):

(a) A polymer represented by the following formula (I):

$$HO-Z-R \qquad (I)$$

wherein Z comprises (1) four moles or more of

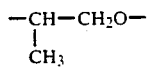

unit and the balance of at least one unit selected from the group consisting of —CH$_2$CH$_2$O— and

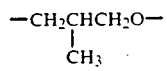

or (2) 10 moles or more of

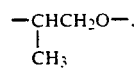

wherein the propylene oxide unit is present in an amount from 5 to 99% by weight of the polymer, and R represents a hydrogen atom, an alkyl group, an aryl group, and alkylcarbonyl group or an arylcarbonyl group, and '(b) a polymer selected from the group consisting of an unsubstituted alkylene oxide of 4-12 carbon atoms or an alkylene oxide of 2-12 carbon atoms substituted with a lower alkyl group, a substituted alkyl group or an aryl group;

wherein said printing ink additive is present in an amount from 1 to 10% by weight.

6. A lithographic printing ink as claimed in claim 5 wherein the weight ratio of said printing additive to said vehicle component is in the range 1:0.5 to 1:5.

* * * * *